US012173546B2

(12) United States Patent
Reddmann

(10) Patent No.: US 12,173,546 B2
(45) Date of Patent: Dec. 24, 2024

(54) OPENING DEVICE FOR A MOTOR VEHICLE DOOR ELEMENT

(71) Applicant: Kiekert AG, Heiligenhaus (DE)

(72) Inventor: Uwe Reddmann, Essen (DE)

(73) Assignee: Kiekert AG, Heiligenhaus (DE)

( * ) Notice: Subject to any disclaimer, the term of this patent is extended or adjusted under 35 U.S.C. 154(b) by 463 days.

(21) Appl. No.: 17/297,490

(22) PCT Filed: Nov. 27, 2019

(86) PCT No.: PCT/DE2019/101016
§ 371 (c)(1),
(2) Date: May 27, 2021

(87) PCT Pub. No.: WO2020/125850
PCT Pub. Date: Jun. 25, 2020

(65) Prior Publication Data

US 2022/0034145 A1 Feb. 3, 2022

(30) Foreign Application Priority Data

Dec. 18, 2018 (DE) ..................... 10 2018 132 665.3

(51) Int. Cl.
*E05F 15/619* (2015.01)
*E05C 17/00* (2006.01)
*E05C 17/08* (2006.01)

(52) U.S. Cl.
CPC .......... *E05F 15/619* (2015.01); *E05C 17/003* (2013.01); *E05C 17/08* (2013.01);
(Continued)

(58) Field of Classification Search
CPC ......... Y10T 292/0978; Y10T 292/1021; E05F 15/619; E05C 17/003; E05C 17/08;
(Continued)

(56) References Cited

U.S. PATENT DOCUMENTS 2,116,446 A * 5/1938 Nishimura .............. E05B 77/00 292/144
3,753,316 A * 8/1973 Savarieau ........... E05B 47/0607 292/201
(Continued)

FOREIGN PATENT DOCUMENTS

DE 4130782 A1 * 3/1993 ........... E05C 17/003
DE 102008042979 A1 * 9/2009 ............ E05F 11/405
(Continued)

OTHER PUBLICATIONS

JP1997317323, WIPO machine translation, 1996 (Year: 2023).*
(Continued)

*Primary Examiner* — Christine M Mills
*Assistant Examiner* — Steven A Tullia
(74) *Attorney, Agent, or Firm* — Renner, Otto, Boisselle & Sklar, LLP

(57) ABSTRACT

An opening device for a motor vehicle door element having an electric drive and an actuating means, wherein the actuating means is adjustable by means of the drive and a gear mechanism arranged between the actuating means and the drive, with the result that a movement of the door element can be made possible, and a sensor for detecting a force on the opening device, wherein the door element can be held by way of the actuating means.

19 Claims, 3 Drawing Sheets

(52) U.S. Cl.
CPC ... *E05Y 2201/412* (2013.01); *E05Y 2201/426* (2013.01); *E05Y 2201/434* (2013.01); *E05Y 2201/604* (2013.01); *E05Y 2400/44* (2013.01); *E05Y 2900/531* (2013.01)

(58) Field of Classification Search
CPC ......... E05Y 2201/412; E05Y 2201/426; E05Y 2201/434; E05Y 2201/604; E05Y 2400/44; E05Y 2900/531; E05B 81/05; E05B 2016/82; E05B 81/20
USPC ...................... 296/146.4; 49/449, 450; 16/82
See application file for complete search history.

(56) References Cited

U.S. PATENT DOCUMENTS

| | | | | | |
|---|---|---|---|---|---|
| 5,263,762 | A * | 11/1993 | Long | E05F 15/632 | 296/146.4 |
| 6,119,538 | A * | 9/2000 | Chang | E05B 81/25 | 74/411 |
| 6,318,771 | B1 * | 11/2001 | Holloway | B60K 15/05 | 292/201 |
| 6,338,536 | B1 * | 1/2002 | Ueno | E05F 15/60 | 49/478.1 |
| 6,964,449 | B2 * | 11/2005 | Takeda | E05F 15/63 | 49/340 |
| 7,069,695 | B2 * | 7/2006 | Hattori | E05F 15/63 | 296/146.4 |
| 8,164,447 | B2 * | 4/2012 | Wittke | E05B 47/00 | 340/545.1 |
| 9,995,066 | B1 * | 6/2018 | Ottolini | E05F 15/616 | |
| 10,711,503 | B2 * | 7/2020 | Linden | B60R 13/043 | |
| 10,711,504 | B2 * | 7/2020 | Roos | E05B 81/14 | |
| 11,008,797 | B2 * | 5/2021 | Termine | E05F 15/622 | |
| 11,447,987 | B2 * | 9/2022 | Ottolini | E05F 15/622 | |
| 2004/0046418 | A1 * | 3/2004 | Chikata | E05F 15/63 | 296/146.4 |
| 2005/0200137 | A1 * | 9/2005 | Nelsen | E05B 81/15 | 292/201 |
| 2006/0071504 | A1 * | 4/2006 | Ishihara | E05F 15/63 | 296/146.4 |
| 2006/0125283 | A1 * | 6/2006 | Guler | E05F 15/63 | 296/146.4 |
| 2007/0176463 | A1 * | 8/2007 | Averitt | E05F 15/643 | 296/146.4 |
| 2007/0241585 | A1 * | 10/2007 | Shimizu | E05F 15/44 | 296/146.6 |
| 2010/0156139 | A1 * | 6/2010 | Herrmann | E05F 15/611 | 296/146.4 |
| 2011/0266080 | A1 * | 11/2011 | Schmitt | E05C 17/006 | 49/358 |
| 2013/0074412 | A1 * | 3/2013 | Wellborn | E05C 17/003 | 16/85 |
| 2016/0010379 | A1 * | 1/2016 | Sauerwein | E05F 15/70 | 49/350 |
| 2016/0245000 | A1 * | 8/2016 | Ottino | E05B 81/18 | |
| 2016/0273255 | A1 * | 9/2016 | Suzuki | E05F 1/14 | |
| 2016/0319577 | A1 * | 11/2016 | Liang | E05C 3/14 | |
| 2017/0002592 | A1 * | 1/2017 | Cervantes, Jr. | E05C 17/003 | |
| 2017/0292311 | A1 * | 10/2017 | Podkopayev | E05C 17/006 | |
| 2018/0038147 | A1 * | 2/2018 | Linden | E05B 81/20 | |
| 2018/0155968 | A1 * | 6/2018 | Miu | E05F 15/70 | |
| 2018/0179788 | A1 * | 6/2018 | Oxley | E05B 81/13 | |
| 2019/0184795 | A1 * | 6/2019 | Ottolini | B60J 5/047 | |
| 2019/0203508 | A1 * | 7/2019 | Harajli | E05F 15/616 | |
| 2019/0292818 | A1 * | 9/2019 | Cumbo | E05B 81/77 | |
| 2020/0048939 | A1 * | 2/2020 | Ottolini | E05B 81/40 | |
| 2020/0263459 | A1 * | 8/2020 | Debroucke | E05B 81/20 | |

FOREIGN PATENT DOCUMENTS

| | | | | |
|---|---|---|---|---|
| DE | 102010031856 | A1 * | 1/2012 | E05C 17/203 |
| DE | 102011015669 | A1 | 10/2012 | |
| DE | 102013103476 | A1 * | 10/2014 | E05F 15/611 |
| DE | 102015003917 | A1 | 9/2016 | |
| DE | 102015108269 | A1 | 12/2016 | |
| DE | 102016004279 | A1 | 10/2017 | |
| DE | 102016105760 | A1 | 10/2017 | |
| DE | 102016207961 | A1 * | 11/2017 | E05F 15/611 |
| DE | 102016212344 | A1 * | 1/2018 | E05C 17/003 |
| DE | 102017214174 | A1 | 2/2018 | |
| DE | 102016218589 | A1 * | 3/2018 | E05C 17/003 |
| DE | 102017223104 | A1 | 6/2018 | |
| DE | 102017124282 | A1 | 4/2019 | |
| DE | 102016124117 | B4 * | 5/2021 | E05F 3/14 |
| EP | 2937497 | A1 * | 10/2015 | B60N 2/366 |
| EP | 3070239 | A1 * | 9/2016 | E05B 63/0056 |
| FR | 2814771 | A1 | 4/2002 | |
| FR | 3074828 | B1 * | 10/2019 | B60J 5/04 |
| FR | 3082547 | A1 * | 12/2019 | E05F 15/73 |
| JP | 2004003774 | A * | 1/2004 | E05F 15/622 |
| JP | 3622408 | B2 * | 2/2005 | E05F 15/10 |
| JP | 2015086529 | A * | 5/2015 | B60J 5/047 |
| KR | 20060069634 | A * | 12/2004 | E05F 5/025 |
| SE | 419255 | B * | 11/1976 | E05B 81/34 |
| WO | WO-9306326 | A1 * | 4/1993 | E05C 17/203 |
| WO | WO-2010084414 | A1 * | 7/2010 | E05C 17/203 |
| WO | WO-2015145868 | A1 * | 10/2015 | B60J 5/04 |
| WO | WO-2019122063 | A1 * | 6/2019 | E05F 15/627 |
| WO | WO-2019174669 | A1 * | 9/2019 | E05B 79/20 |

OTHER PUBLICATIONS

Translation of International Search Report issued Mar. 16, 2020, for related International Patent Application No. PCT/DE2019/101016.

* cited by examiner

OPENING DEVICE FOR A MOTOR VEHICLE DOOR ELEMENT

This application is a national phase of International Application No. PCT/DE2019/101016 filed Nov. 27, 2019, which claims priority to German Patent Application No. 10 2018 132 665.3 filed Dec. 18, 2018.

FIELD OF DISCLOSURE

The invention relates to an opening device for a motor vehicle door element having an electric drive and an actuating means, wherein the actuating means is adjustable by means of the drive and a gear mechanism arranged between the actuating means and the drive, and to a sensor.

BACKGROUND OF DISCLOSURE

Today's motor vehicles are increasingly being provided with convenience functions. For example, in order to facilitate boarding into a motor vehicle and to be able to influence the aesthetic and aerodynamic shape, motor vehicles are equipped, for example, without an outer door handle. It is also conceivable, however, that an outside door handle is provided, but that this only forwards a switching signal to the motor vehicle door latch in order to open it. In order to facilitate and automate boarding and, for example, to allow for boarding in vehicles without handles on the outside of the door, so-called opening devices or door openers, some of which are also referred to as door arresters, are used.

From DE 10 2011 015 669 A1, an opener for motor vehicle doors or flaps is known, with which a door, flap, or hood can be transferred from a closed position into an open position. If the display device relates, for example, to a motor vehicle side door, the door can be opened by means of an electrical pulse. For this purpose, the locking mechanism of the door lock must first be unlocked, preferably electrically, so that the door can be opened. If, for example, the door sealing pressure is not sufficient to move the door from the closed position into an open position, the door can be moved into an open position by means of the opening device. An open position is defined in this case in such a way that the operator of the motor vehicle is able to grasp the door so that he can open the door completely. An electric drive is used as the opening device, which acts mechanically on the motor vehicle door in the form of a pivoting movement of the levers via a drive pawl and an inner and outer lever.

DE 10 2016 105 760 A1 discloses an opening device for a motor vehicle door with a base plate, furthermore with a drive element mounted on the base plate and a drive, a first sensor assigned to the drive element being provided which distinguishes at least between an opening operation and a manual opening operation. The opening device comprises a drive which can be driven via a sensor and a control unit. A flexible connecting means then allows for a pivoting of a transmission lever, which in turn allows for an opening movement via a drive lever and a drive slide. In order to allow a movement of the door, the drive slide moves linearly and, for example, out of an opening in a body so that an unlocked and unblocked door can be opened at least in some regions. The end position of the drive slide can be detected by means of a second stationary sensor, so that the drive can again be switched off.

From the applicant's unpublished patent application, DE 10 2017 124 282 A1, an opening device for a motor vehicle door element has become known, having an electric drive and an actuating means, wherein the actuating means is adjustable by means of the drive and a gear mechanism arranged between the actuating means and the drive. The door can be moved by means of the opening device, a sliding element being arranged on the actuating means which interacts with a switching means so that the door movement can be detected. The actuating means is substantially formed from a driven toothed rack having an integrated sliding element, switching means, and electrical supply line. By means of the switching means between the sliding element and the body, it is possible to control the movement of the driven toothed rack.

The devices known from the state of the art for opening a motor vehicle door after a motor vehicle lock has been unlocked make it possible for the door to be opened at least in some regions so that an operator of the motor vehicle is able to grasp the door through a gap and open it completely. The known opening devices have basically proven themselves, but reach their limits when the electrically operated doors are opened electrically, for example on a sloping street. This is the starting point for the invention.

SUMMARY OF DISCLOSURE

The object of the invention is to provide an improved opening device for a motor vehicle door element. In addition, it is the object of the invention to provide an opening device which allows for safe opening even of vehicles parked on sloping roads. Furthermore, the object of the invention is to provide a structurally simple and inexpensive solution.

The object is achieved by the features of the disclosure. Advantageous embodiments of the invention are specified in the disclosure. It should be noted that the exemplary embodiments described below are not restrictive; rather, any variation possibilities of the features described in the description are possible.

According to the disclosure, the object of the invention is achieved in that an opening device for a motor vehicle door element having an electric drive and an actuating means is provided, wherein the actuating means is adjustable by means of the drive and a gear mechanism arranged between the actuating means and the drive, with the result that a movement of the door can be made possible, and a sensor, wherein the door element can be held by way of the actuating means. By means of the construction of the opening device according to the invention and in particular from the combination of a sensor with which a force acting on the drive unit can preferably be detected and an actuating means with which the door element can be held, opening, holding, and thus making the door available to an operator can be allowed. Due to the structure according to the invention, the door element can be presented to the operator, it being possible at the same time to provide a safeguard to prevent the door element from opening independently. The vehicle can also be on a sloping road, the door element being able to be held by means of the actuating means. If the door element is electrically released by means of the motor vehicle lock and the opening device is activated, the door element opens automatically but only so far that an operator can grasp the door element and open it manually. The opening device only opens the door element to such an extent that the operator can grasp the door element, but at the same time no unintentional opening beyond the open position takes place by means of the opening process. Thus the highest level of security that neither endangers people nor opens the door element itself into a danger area is ensured.

The door preferably does not open any further than the overall width of the motor vehicle, i.e. including, for example, the mirror.

The opening device is used in a motor vehicle door element. The motor vehicle door element can also be, for example, a flap, hood, or cover, for example for a convertible roof. Holding the component that is movably arranged on the motor vehicle, for example due to environmental influences, such as wind, can also be necessary in order to prevent unintentional opening. The opening device can thus be used where a component that is movably arranged on the motor vehicle is to be positioned for further opening. In an advantageous manner, the opening device interacts with an electrically operable locking system, so that a high degree of constructive freedom can be made possible in the design of the door element. For example, the door element can do without a door handle, which results in almost any shape of an outer shape of the door element.

The opening device is usually arranged in the region of the door element in such a way that the door element can be positioned by an operation of the opening device. The opening device generates a relative movement between the body and the door element, the opening device preferably being arranged in the door element itself. An arrangement in the body for the movement of the door element is of course also conceivable. It is also conceivable that the opening device is integrated into the motor vehicle lock, for example a side door. This offers the advantage that an electrical voltage is available for the drive and/or that further functions in the motor vehicle lock can be operated by the drive.

The electric drive preferably consists of a direct current motor which interacts with an output shaft and, for example, with the actuating means via a worm gear. One-, two-, or multi-stage gears are conceivable, whereby the selection of the gear mechanism can influence the force available on the actuating means. If, for example, the opening device is arranged in the door element in such a way that the opening device interacts, for example, with an A-pillar of the motor vehicle and a front door, higher forces are necessary to position the door element than if the opening device is again arranged in a front door of a motor vehicle and acts on a B-pillar in the motor vehicle. In the event of opening a door and of an arrangement of the opening device in the region of the motor vehicle lock, lower forces are necessary, so that higher gear ratios can be used.

The electric drive allows the actuating means to move. By means of the electric motor, it is possible to move the actuating means in such a way that the door can be opened by the driven actuating means. The actuating means moves relative to the body and exerts a compressive force on the vehicle door element, so that the unlocked and unblocked door can be moved.

The opening device preferably interacts with a motor vehicle lock which has a rotary latch and at least one pawl, the locking mechanism comprising the rotary latch and at least one pawl being electrically unlockable. In particular in the case of electrically unlockable locking systems, the operator of the motor vehicle only needs an electrical pulse to move the locking system into an unlocked, i.e. open, position. The locking system is then open so that the door or flap can be moved. The electrical opening impulse for the motor vehicle lock can be generated by means of a sensor, a key or, for example, a sensitive means, such as a touch sensor or an outside door handle with an integrated sensor.

Once the vehicle door element is unlocked, the door element can be freely pivoted in the hinges. The door may also have a door strap which can hold the door in a plurality of open positions. The door, once unlocked, can then be moved by means of the opening device, the movement of the vehicle door element being detectable by sensors. The entire opening process is detected. A continuous detection takes place, so that the door movement can be detected at any point in time of the movement of the vehicle door element by means of the opening device. A door once manually moved beyond the movement of the opening device separates the sensor-based detection so that the electric drive can be switched off or the electric drive can be reversed so that the actuating means can be moved back to its starting position. The detection of a manual movement of the vehicle door element is explained in detail below.

In one embodiment of the invention, the actuating element has a locking means, in particular a locking lever. By means of a locking means integrated into the actuating element, the possibility is now created of realizing a secure holding of the vehicle door element in addition to the sensor-based detection of the actuating movement. By means of the locking means, it is possible to guide and hold the vehicle door element in every movement of the door element generated by the opening device. The guiding and holding of the door element not only allows for an automatic opening of the door element, but also creates the possibility of achieving a closing movement by means of the opening device. The opening device can thus also be referred to as a combined opening and closing device.

If the locking means can be connected to the body of the motor vehicle in a form-fitting manner, this results in a further embodiment variant of the invention. If the motor vehicle door element is opened electrically, for example, i.e. the locking mechanism is unlocked, the door element can be freely pivoted in the hinges. Now the opening device can open the door element, the locking means being in engagement with the body in a form-fitting manner. A secure holding during the movement of the door element by means of the opening device can thus be ensured at all times. A form fit is advantageous because the security when holding the door element can be increased. The form fit can take place, for example, by means of a recess in the actuating means and a spring-loaded locking means that can be brought into engagement with the recess. The recess can be present in the body or in the actuating means, and the locking means can also be attached to the body or to the actuating means. The locking means can be in the form of a hook, ball or, for example, a bayonet lock. The locking means can, for example, engage in a recess, an undercut, or a gap in a spring-loaded manner. In any case, a form fit of this type can be produced by means of the locking means, such that the vehicle door element can be securely held over the entire range of movement of the opening device. The locking means can then be released from the form fit, for example by means of a manual movement of the motor vehicle door element.

The connecting means can advantageously be brought into detachable engagement with the body. The release can take place, for example, by manual operation of the vehicle door element. For this purpose, the operator must, for example, after opening the door element, manually grasp the door element and move it beyond the opening path. The locking means can consist, for example, of a spring-loaded ball or also a plurality of spring-loaded balls which, for example, engage circumferentially in a form-fitting manner in the body and can be moved out of the region of engagement with the body. The force of the form fit is overcome by the manual operation of the door element.

As will be explained below, the electric drive receives an electrical signal after the connecting means has been released from the body, as a result of which the actuating means can be reset to the starting position. A spring-assisted releasability of the connecting means is advantageous, since this allows for a permanently stable locking means to be implemented. According to the invention, however, it is also conceivable that, for example, an elastic locking means is used, wherein a form fit between the actuating means and the body can be produced by means of an elastic plastics material element. For example, the locking means can be arranged at one end of the actuating means and, for example, have a spherical shape which engages in a form-fitting receptacle of an elastic plastics material element in the body.

In a further embodiment variant of the invention, the locking means can be electrically driven and controlled, in particular driven and controlled by means of an electric motor drive. An electrical control of the locking means allows for increased security when establishing a connection between the actuating means and the body. It is conceivable, for example, that a locking lever is arranged in the actuating means, which can be operated by means of a locking slide. If, for example, the locking lever is arranged pivotably in the actuating means at a radial end of the actuating means, then pivoting of the locking lever can be initialized by means of the locking slide. The pivoting of the locking lever can then be used to engage in the body. As long as the locking slide is in engagement with the locking lever, a secure holding of the door element is possible.

If the locking slide is brought out of engagement with the locking lever, the locking lever can, for example, be spring-loaded or, through manual operation of the door element, can be disengaged from the body. The locking slide is, for example, driven displaceably in the actuating means and, for example, can be displaced back and forth in the actuating element via an electrically driven spindle gear mechanism. The locking slide can, for example, have a locking contour that can be brought into engagement with the locking lever, the locking lever being pivotably accommodated in the control member or actuating means or, for example, in two parts and spreadable, so that the locking lever can, for example, get behind the locking contour in a form-fitting manner. In the case of a one-piece construction of the locking lever, one-sided engagement in the body is conceivable, with a mutual pivoting of the locking levers being conceivable for a two-part construction of the locking lever, for example, so that two-sided engagement, i.e. spreading into the body or the locking contour, can take place.

It can also be advantageous if the locking means has a locking slide which can be operated, in particular displaced, by means of the electric drive. To operate the locking lever, the locking slide is moved by means of the drive and preferably using a spindle gear mechanism. In other words, the motor can carry a spindle on its output shaft, the spindle interacting directly with the locking slide, so that the locking slide can be moved back and forth. The spindle gear mechanism is preferably not designed to be self-locking, which is particularly advantageous when an emergency operation described below is used.

In a further embodiment variant, the locking lever can be operated, in particular pivoted, by means of the locking slide. The locking slide is displaceable by means of the spindle drive and thus comes into engagement with the locking slide. The locking slide is pivotably but stationary accommodated in the actuating element. Advantageously, the locking slide and locking lever have a cooperating contour, for example a conically tapering end in each case, so that interlocking is facilitated and pivoting of the locking slide is supported. If the locking slide comes into engagement with the locking lever, the locking lever is pivoted and at the same time held in its pivoted position. The locking slide thus serves as a positioning lock for the locking lever. If the locking lever comes into engagement with a locking contour, a secure opening or closing can be made possible by means of the opening device.

A further embodiment variant of the invention results when the locking means is integrated into the actuating element. On the one hand, a space-saving opening device can be implemented through an integrated design and, on the other hand, the components of the locking means can be protected from environmental influences. The locking means is arranged in the actuating element, the actuating element being moved out of the door element so that rain, snow, dust, and other environmental influences are exposed. The integrated solution now makes it possible to protect the locking means, i.e. the drive, the gear mechanism, the locking slide, and the locking slide, from environmental influences. This is particularly advantageous because the components of the locking means are formed from mechanically mounted parts which, for example, are dependent on lubrication and to the extent that the environmental influences cannot impair the function.

Advantageously, the locking lever can be brought into engagement with a locking contour, in particular the locking lever being able to be brought into engagement with a locking contour by means of a damping means. The locking lever can be pivoted by means of the locking slide, so that the locking lever is able to engage in a contour of the body of the vehicle. The body preferably has a locking contour that can also be designed separately. In other words, on the one hand, the locking lever can, for example, engage in an opening in the body or interact with a locking contour attached to the body. In any case, a form fit can be achieved through the interaction of the locking lever and the locking contour, so that a targeted and safe introduction of a force from the actuating means onto the body can be made possible. The opening device is consequently able, firstly, to find a stable and stationary support when opening the door element, secondly to allow a holding of the door element in the open position and, thirdly, to allow a closing of the door element by means of the opening device.

By using a damping means, the interaction of the locking slide and the locking contour can be improved, in particular a low-noise engagement, guidance, and holding of the door element can be ensured. The damping means can be mounted, molded, held in a form-fitting manner, or arranged in a comparable manner on the locking lever. In addition, it is also conceivable according to the invention that the damping means is arranged in the region of the body and/or on the locking contour.

In one embodiment of the invention, the locking means has an emergency operation so that the locking means can be unlocked manually. For example, there can be an engagement surface on the locking slide itself, by means of which a manual release of the locking slide can be made possible. In this case, the locking slide can be manually brought out of engagement from the locking lever in order to result in a release of the locking means with the body. The emergency operation can also be formed, for example, from a push button which, for example, separates the locking lever. In this case, the locking slide can be designed in two parts, for example, so that the locking means with the body can be released.

Furthermore, it is conceivable according to the invention that the emergency operation is formed from an engagement contour, in particular a shaft contour, on the locking slide. In other words, the actuating element can have an opening from which the engagement contour protrudes or through which the engagement contour can be gripped. A shaft contour offers the advantage that the emergency operation can be easily felt and, on the other hand, the introduction of force into the operation or engagement contour is improved. The locking slide is moved into an initial position by means of the emergency operation so that the locking slide comes out of engagement with the locking lever. For this purpose, the locking slide must operate the spindle drive, which, however, as described above, may advantageously not be designed to be self-locking.

Furthermore, it is conceivable according to the invention that at least one gear component is pivotably accommodated in the opening device, in particular in a gear mechanism carrier of the opening device. Overload protection can be implemented through a pivotable mounting of at least one transmission component. In particular in the case in which the door element experiences an excessive load, an overload protection can be implemented by means of the pivotable gear mechanism component. An excessive load can occur, for example, if the door element cannot be opened due to the weather, i.e. if the door seal is iced up, for example. On the other hand, it can also happen that, for example, due to an external blocking of the door element or a, a manual operation of the door element by means of the opening device takes place before reaching the end position of the door element. In the event of this excessive load, the pivoting gear component can prevent damage to the opening device and compensate for movements.

If a force measuring device, in particular a Hall sensor, is arranged on the gear mechanism carrier, this results in a further embodiment variant of the invention. A movement of the gear mechanism carrier can be detected by the force measuring device on the gear mechanism carrier, as a result of which an excessive load on the opening device can be detected. A Hall sensor is useful because it allows for a non-contact detection of a movement and, in particular, the detection of small paths of the gear mechanism carrier. The force measuring device is coupled to the drive of the opening device and to a controller in the motor vehicle, so that when an excessive load is detected on the opening device, reversing or stopping of the drive motor of the opening device can be initiated by means of a detection of a movement by the force measuring device of the gear mechanism carrier. At the same time, a control signal can also be passed to the locking means in order, for example, to stop, prevent, or cancel a locking. The force measuring device thus serves as a control element and prevents damage to the opening device.

According to the invention, the gear mechanism carrier can interact with a spring element, a pivoting movement of the gear mechanism carrier being able to be cushioned. The connection of the gear mechanism carrier to a spring element makes it possible to secure a central position of the gear mechanism carrier. A central positioning of a gear mechanism carrier is important because, on the one hand, tensile loads as well as pressure loads can occur on the actuating means. For example, an operator can pull open the door element before the locking means has been released or, for example, push the door element shut while the opening device opens the door element. In both cases, the gear mechanism carrier can be resiliently deflected by means of the spring element. In this case, the gear mechanism carrier can be accommodated pivotably in the opening device and pivoted around a pivot axis from a central starting position in two directions of movement. The force measuring device, in particular the sensor device, is advantageously arranged on the gear mechanism carrier in such a way that a movement of the gear mechanism carrier in both directions of movement can be detected by means of the force measuring device.

The spring element is advantageously a leaf spring. By means of a leaf spring, on the one hand, a sufficiently high force to secure the central position of the gear mechanism carrier can be provided and, on the other hand, sufficient play for the gear mechanism carrier can be provided. The construction of the opening device according to the invention allows a secure holding of the door element, while at the same time ensuring a high level of operational safety.

BRIEF DESCRIPTION OF DRAWINGS

The invention is explained in more detail in the following with reference to the attached drawings on the basis of a preferred exemplary embodiment. However, the principle applies that the exemplary embodiment does not limit the invention, but merely represents an embodiment. The features shown can be implemented individually or in combination with further features of the description.

In the drawings.

DETAILED DESCRIPTION

Figure 1:
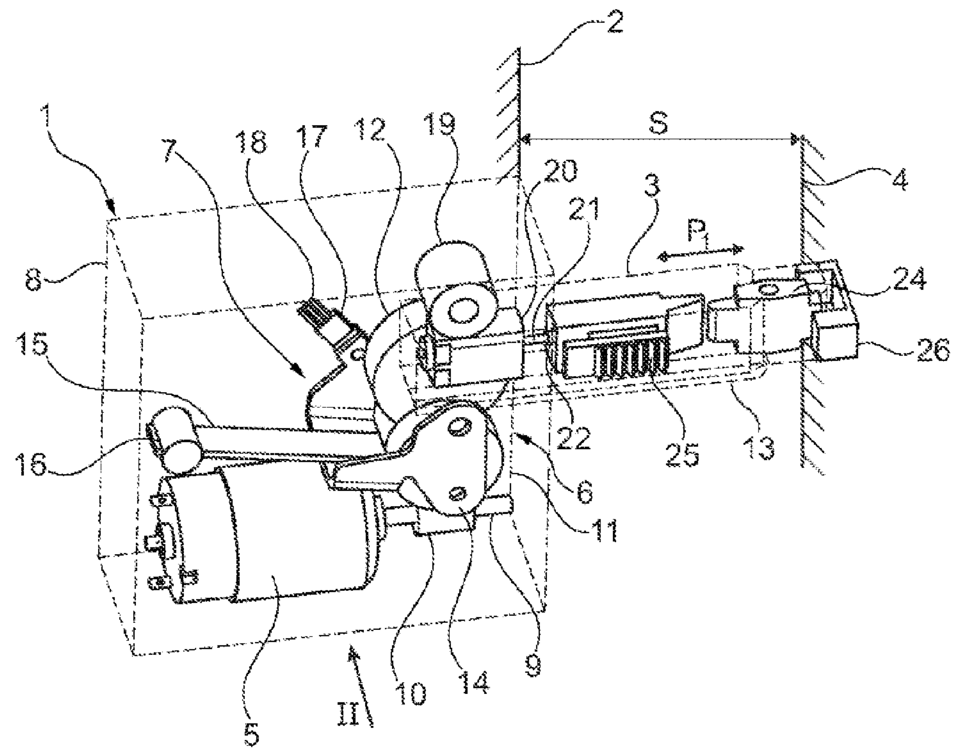
FIG. 1 is a three-dimensional view of an opening device according to the invention with an extended actuating means.

FIG. 1 shows a three-dimensional view of an opening device 1 with the components substantial for explaining the invention. The opening device 1 is arranged in a motor vehicle door element 2, an actuating means 3 being in engagement with a body 4. In this respect, the extended position of the actuating means 3 is shown, so that in this state the opening device 1 has moved the door element 2 over the positioning path S and has positioned it. In the position shown, the vehicle door element 2 can consequently be grasped by an operator and further opened manually.

The opening device has an electric drive 5, a gear mechanism 6, a force measuring device 7, a housing 8, and the actuating means 3. The drive 5 is preferably formed from an electric direct current motor with an output shaft 9 and a gear wheel 10 located on the output shaft 9. In this exemplary embodiment, the gear mechanism 6 has a multi-stage design, a first gear mechanism stage 11 being in direct engagement with the output of the electric drive 5 in engagement. A second gear mechanism stage 12 is driven by means of the first gear mechanism stage 11, the second gear mechanism stage 12 being in engagement with a toothed rack 13 on the actuating means 3. The actuating means 3 can consequently be adjusted in the direction of the arrow PI via the drive 5 and the two gear mechanism stages 11, 12. The actuating means 3 can be moved out of the housing 8 and into the housing in the direction of the arrow P1.

A gear mechanism carrier 14 forms a first fixed bearing for the first gear mechanism stage 11, the second gear mechanism stage 12 being accommodated in the opening device 1 in a pivotable manner by means of the gear mechanism carrier 14. In this exemplary embodiment, a leaf spring 15 is fastened to the gear mechanism carrier 14, the leaf spring 15 being firmly connected to the gear mechanism carrier 14 on one side and being arranged in a fixed bearing 16 on the side opposite the gear mechanism carrier 14. To detect a pivoting movement of the gear mechanism carrier 14, a sensor 17, in particular a Hall sensor, is arranged in a stationary manner in the opening device 1 and is connected to a control device (not shown) by means of electrical contacts 18. Of course, the sensor 17 can also be arranged on the gear mechanism carrier 14.

A guide means 19 is arranged in the opening device 1 on the opposite side of the actuating means 3 from the toothed rack 13 in order, on the one hand, to allow for a smooth operation of the actuating means 3 and, at the same time, to provide stable guidance for the actuating means 3. The guide means 19 can be, for example, a bearing or a roller or a combination of a bearing, roller, and/or damping means.

The actuating means 3 has an electric drive 20, the output shaft 21 of which drives a spindle 22 in this exemplary embodiment, the spindle 22 extending into a locking slide 23 and interacting with the locking slide 23. The locking slide 23 is slidably accommodated in the actuating means 3. The locking slide 23 works together with a locking lever 24, the effect of which is explained in more detail below.

An emergency operation 25 can also be seen in FIG. 1, which in this embodiment is designed as a shaft contour, the locking slide 23 being manually operable by means of the emergency operation 25, so that the locking lever 24 can be manually brought out of engagement with the body 4 and in particular with a locking contour 26.

The electrical contacting of the drives 5, 20 and the sensor 17 are not explicitly shown, the electrical components 5, 17, 20 being electrically connected to a control unit (not shown) within the opening device 1 and/or the motor vehicle itself.

Figure 2:
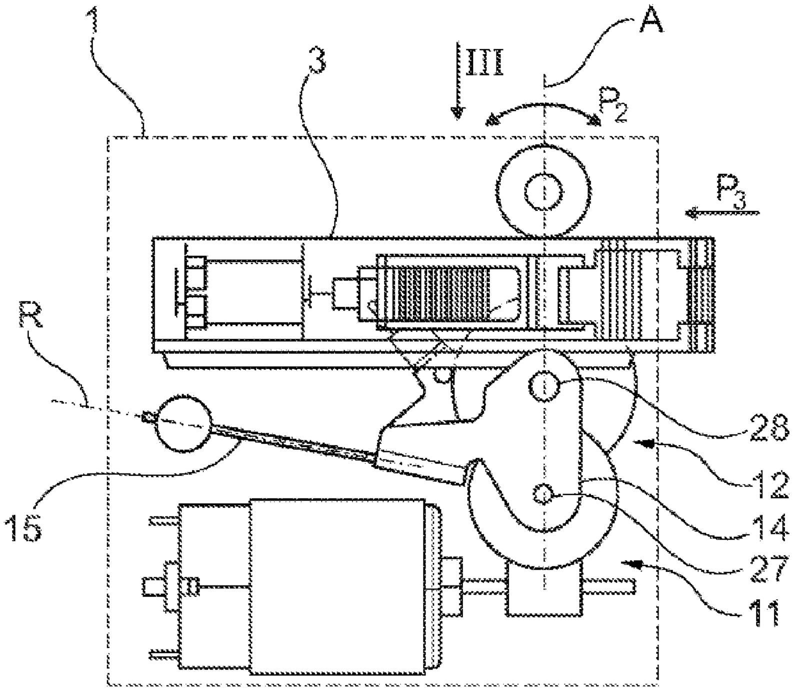
FIG. 2 is a side view of the opening device with a retracted actuating means.

FIG. 2 shows a side view of the opening device 1 according to the arrow II from FIG. 1, the actuating means 3 being shown in a retracted position. The same components are provided with the same reference signs. The axis 27 of the first gear mechanism stage 11 can be clearly seen, the axis 27 being fixedly arranged in the opening device 1 and at the same time forming a pivot axis 27 for the gear mechanism carrier 14. The gear mechanism carrier 14 contains a bearing point 28 for the second gear mechanism stage 12, the second gear mechanism stage 12 and in particular the bearing point 28 being shown in a starting position A. The gear mechanism carrier 14 can be pivoted about the starting position A in both directions via the axis 27 in the direction of the arrow P2. By means of the leaf spring 15, the gear mechanism carrier 14 is held in the starting position A and is spring-loaded.

The retracted position of the actuating means 3 shown in FIG. 2 corresponds to a closed door element 2, the actuating means being shown moved into the opening device 1 in the direction of the arrow P3. The door element 2 is held in the closed position by means of a motor vehicle lock, for example.

Figure 3:
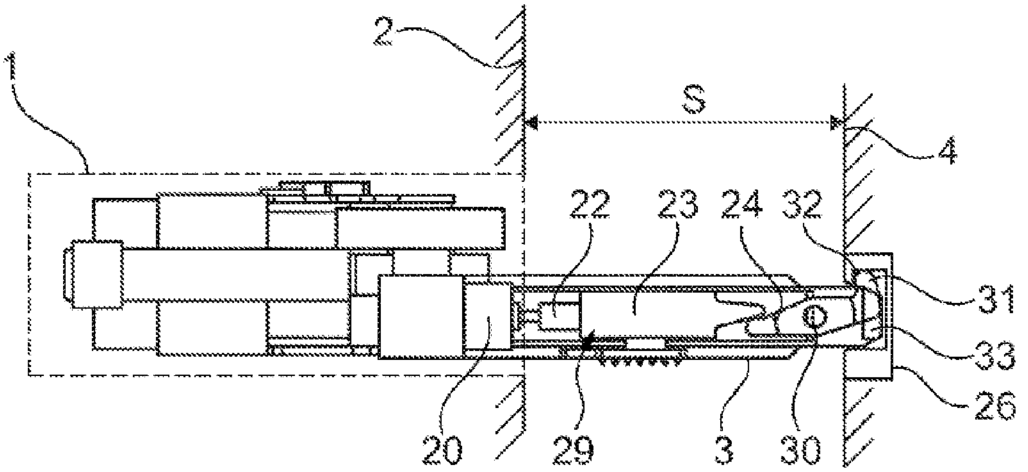
FIG. 3 is a view of the opening device from a view according to the arrow III in FIG. 2, the actuating means being shown in the extended state and with the locking means in engagement.

In FIG. 3, a view of the opening device 1 from the direction of arrow III in FIG. 2 is shown. In FIG. 3, the actuating means 3 is shown in a maximally extended position in which the opening device 1 has moved the door element 2 over the travel path or adjusting path S. The locking means 29 secures the door element 2 in the holding position. In this exemplary embodiment, the locking means 29 is formed from the drive 20, the spindle drive 22, the locking slide 23, and the locking lever 24. The locking lever 24 is accommodated in the actuating means 3 so as to be pivotable about the axis 30. The locking lever 24 engages with an extension 31 in an undercut 32 of the locking contour 26. The locking lever 24 is pivoted into the locking contour 26 by the locking slide 23, the locking lever 24 executing a pivoting movement about the axis 30. At the end, the actuating means 3 can have a damping means 33 in order to allow for a low-noise interaction between the opening device 1 and the body 4.

Figure 4:
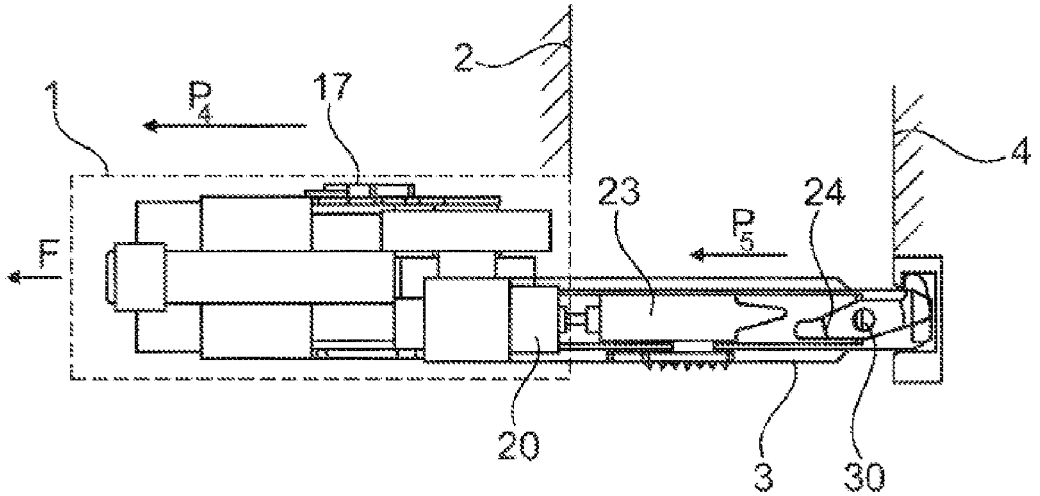
FIG. 4 is the view of the opening device according to the arrow III from FIG. 2 having a released locking lever.

In FIG. 4, the position of the locking slide 23 is shown, in which, for example, the operator has manually grasped the door element 2 and applies a force F to the opening device or the door element 2 in the direction of the arrow P4. This operation of the opening device 1 or the door element 2 can be detected by means of the sensor 17, as will be explained in more detail below. The movement of the opening device 1 in the direction of the arrow P4 causes the electric drive 20 to be activated, so that the locking slide 23 is withdrawn within the actuating element 3 in the direction of the arrow P5. By pulling back the locking slide 23, the locking lever 24 is released and can be pivoted about the axis 30.

Figure 5:
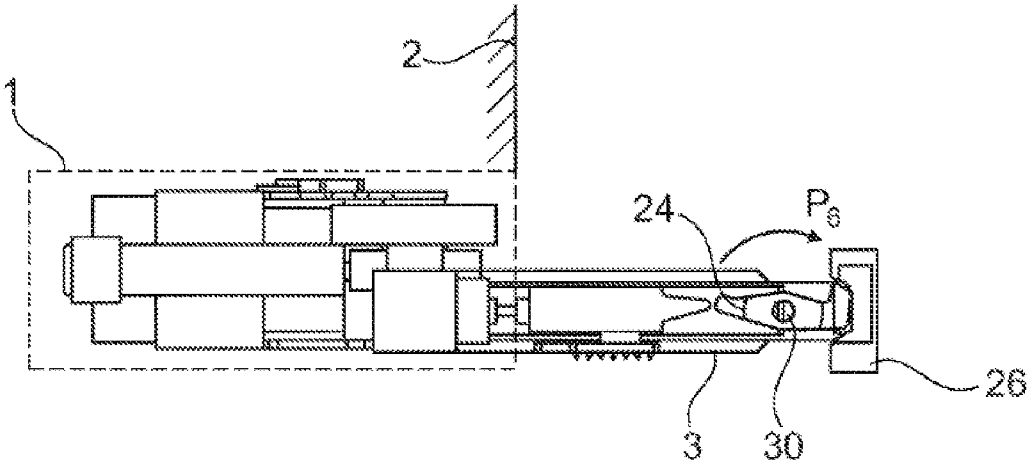
FIG. 5 is a view of the opening device according to the arrow III from FIG. 2 having an actuating means moved out of the body.

In FIG. 5, the position of the locking lever 24 is now shown, into which the locking lever 24 comes upon further operation or movement of the door element 2. The locking lever 24 pivots in the direction of the arrow P6 around the axis 30 in the actuating means 3 and thus comes out of engagement with the locking contour 26. The door element 2 can now be moved freely and the actuating means 3 can be moved into the opening device 1.

Figure 6:
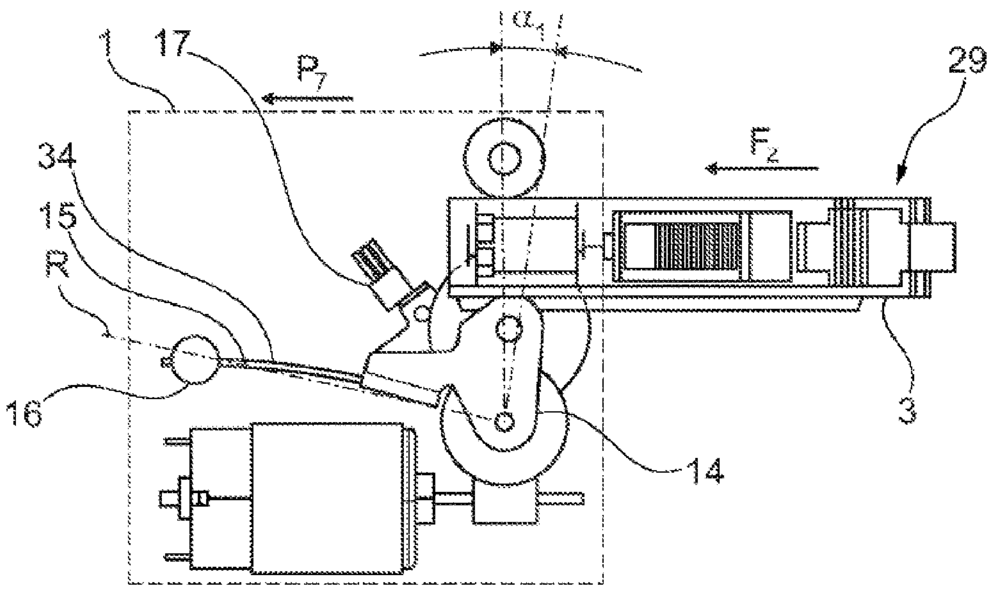
FIG. 6 is a view of the opening device from the direction of arrow II from FIG. 1, a position of the opening device being shown in which a tensile load acts on the opening device.

In FIG. 6, a side view from the direction of the arrow II from FIG. 1 onto the opening device 1 is shown again. A position of the gear mechanism carrier 14 is shown which the gear mechanism carrier 14 assumes when a tensile force FZ acts on the actuating means 3. It is consequently a force measurement by means of the sensor (17). This tensile force FZ acts when the locking means 29 is in engagement with the locking contour 26 and a movement in the direction of the arrow P7 is also initiated in the opening device 1, for example by manually grasping and opening the door element 2. The gear mechanism carrier 14 pivots by the angle $\alpha 1$, whereby the gear mechanism carrier 14 is displaced by the angle $\alpha 1$, the adjustment angle $\alpha 1$ being present around the starting position A in a clockwise direction. This pivoting of the gear mechanism carrier 14 can be detected by means of the stationary sensor 17. A curvature 34 of the leaf spring 15 around the rest position R can also be clearly seen. The leaf spring 16 is accommodated in a stationary but pivotable manner in the fixed bearing 16. FIG. 6 thus shows the situation into which the opening device 1 gets when the opening device has moved the door element 2 and the door element 2 is, for example, gripped and opened by an operator. The sensor 17 detects this tensile force FZ of the operator and initiates unlocking of the locking means 29 in the form described above.

Figure 7:
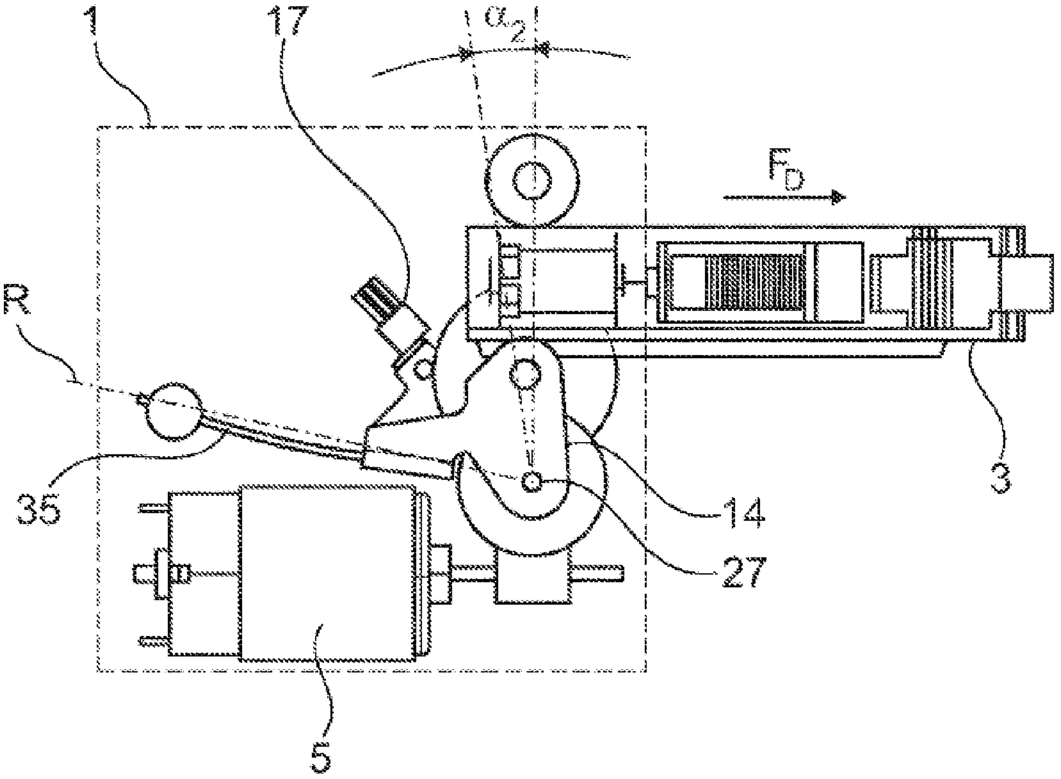
FIG. 7 is a view of the opening device according to the arrow II from FIG. 1 in the event of a pressure load, i.e. a load in the direction of the body, acts on the opening device.

FIG. 7 now shows the situation in which a compressive force FD is introduced into the opening device 1. Due to the compressive force FD, the gear mechanism carrier 14 is pivoted counterclockwise in the direction of the angle α2 around the axis 27, which in turn can be detected by means of the sensor 17 and the relative movement between the sensor 17 and the gear mechanism carrier 14. The leaf spring 15 in turn experiences a curvature 35. In this case, the drive 5 of the actuating means 3 would be activated by the controller and the actuating means 3 would be moved into the opening device 1. This case can occur, for example, if the operator wants to manually close the motor vehicle again immediately after opening. In this case, manual closing can be supported or automatic closing can be initiated by means of the opening device 1. The opening device 1 then acts as a closing device for the door element 2, the door element 2 being drawn into a closed position by means of the electric drive 5, the gear mechanism 10, 12, the actuating means 3, and the locking means 29. For closing, the extension 31 of the locking means 29 engages behind the locking contour 26 on the body 4.

LIST OF REFERENCE SIGNS

1 Opening device
2 Motor vehicle door element
3 Actuating means
4 4 Body
5, 20 Drive
6 Gear mechanism
7 Force measuring device
8 Housing
9, 21 Output shaft
10 Toothed gear
11 First gear mechanism stage
12 Second gear mechanism stage
13 Toothed rack
14 Gear mechanism carrier
15 Leaf spring
16 Fixed bearing
17 Sensor
18 Electrical contacts
19 Guide means
22 Spindle drive
23 Locking slide
24 Locking lever
25 Emergency operation
26 Locking contour
27, 30 Axis
28 Bearing point
29 Locking means
31 Extension
32 Undercut
33 Damping means
34, 35 Curvature
S Travel
P1, P2, P3, P4, P5, P6, P7 Arrow
A Starting position
F Force
FZ Traction
FD Compressive force
R Rest position
α1, α2 Angle

The invention claimed is:

1. An opening device for a motor vehicle door element, the opening device comprising:
an electric drive;
an actuator that is adjustable by the electric drive and a gear mechanism arranged between the actuator and the electric drive, whereby a movement of the door element is possible, wherein the gear mechanism includes a first gear mechanism stage and a second gear mechanism stage, wherein the gear mechanism is pivotably accommodated in a gear mechanism carrier of the opening device, wherein the gear mechanism carrier is pivotable about an axis fixedly arranged in the opening device, wherein the axis is a pivot axis of the first gear mechanism stage and the gear mechanism carrier includes a bearing point for the second gear mechanism stage spaced from the axis such that the second gear mechanism stage is pivotable about the axis; and
a sensor configured to detect a pivoting movement of the gear mechanism carrier about the axis, wherein the motor vehicle door element is held by the actuator.

2. The opening device according to claim 1, wherein the actuator has a lock.

3. The opening device according to claim 2, wherein the lock is connected to a body of a motor vehicle in a form-fitting manner.

4. The opening device according to claim 3, wherein the lock is releasably brought into engagement with the body.

5. The opening device according to claim 2, wherein the lock is electrically controllable by an electromotive drive.

6. The opening device according to claim 5, wherein the lock has a locking slide which is configured to be displaced by the electromotive drive.

7. The opening device according to claim 6, wherein the lock includes a locking lever that is pivotable by the locking slide.

8. The opening device according to claim 6, wherein the lock includes a locking lever that is brought into engagement with a locking contour.

9. The opening device according to claim 8 further comprising a damper configured to bring the locking lever into engagement with the locking contour.

10. The opening device according to claim 6, wherein the locking slide is slidably accommodated in the actuator.

11. The opening device according to claim 2, wherein the lock is integrated into the actuator.

12. The opening device according to claim 2, wherein the lock has an emergency operation so that the lock is unlocked manually.

13. The opening device according to claim 12, wherein the emergency operation is formed from a shaft contour on a locking slide.

14. The opening device according to claim 2, wherein the lock is a locking lever.

15. The opening device according to claim 1, wherein the electric drive is arranged in a housing and the actuator is movable into and out of the housing.

16. The opening device according to claim 1, wherein the gear mechanism is engageable with a toothed rack formed on the actuator.

17. The opening device according to claim 1, further comprising a spring element configured to bias the gear mechanism carrier toward a central position.

18. The opening device according to claim 17, wherein the sensor is configured to detect pivoting of the gear mechanism carrier about the axis with respect to the biased central position of the gear mechanism carrier.

19. The opening device according to claim 17, wherein the spring element comprises a leaf spring connected to the gear mechanism carrier at a first end and a fixed bearing in the opening device at a second end opposite the first end.

* * * * *